United States Patent [19]

Nuss

[11] Patent Number: 4,869,419

[45] Date of Patent: Sep. 26, 1989

[54] METHOD OF CONNECTING ELECTRICAL CONDUCTORS AND APPARATUS FOR CARRYING OUT THE METHOD

[75] Inventor: Lothar Nuss, Offenbach, Fed. Rep. of Germany

[73] Assignee: STAPLA Ultraschall-Technik GmbH, Frankfurt, Fed. Rep. of Germany

[21] Appl. No.: 128,288

[22] Filed: Dec. 3, 1987

[30] Foreign Application Priority Data

Jun. 6, 1987 [DE] Fed. Rep. of Germany ....... 3719083

[51] Int. Cl.$^4$ .............................................. B23K 20/10
[52] U.S. Cl. ...................................... 228/110; 228/1.1
[58] Field of Search ......................... 228/110, 111, 1.1; 219/56, 56.1; 156/73.2; 29/872

[56] References Cited

U.S. PATENT DOCUMENTS

| | | | |
|---|---|---|---|
| 4,032,382 | 6/1977 | Obeda | 228/1.1 |
| 4,596,352 | 6/1986 | Knapp | 228/1.1 |
| 4,646,957 | 3/1987 | Nuss | 228/1.1 |
| 4,730,764 | 3/1988 | Hawkins et al. | 228/4.5 |

Primary Examiner—Nicholas P. Godici
Assistant Examiner—Samuel M. Heinrich
Attorney, Agent, or Firm—Allegretti & Witcoff, Ltd.

[57] ABSTRACT

A method for ultrasonically welding electrical conductors in which the compaction of the electrical conductors carried out in a compaction chamber takes place in two compaction phases, in which the electrical conductors are first compacted substantially in a vertical direction and thereafter both in a vertical and in a horizontal direction, wherein, during the second compaction phase with superimposed movements, the ultrasonic action takes place for welding the electrical conductors. Several forms of embodiment of an apparatus for carrying out this method and modified methods are described, the common feature of which is the mounting of a crosshead (7), displaceably parallel to a sonotrode surface (2), on a second, vertically displaceable anvil part (8), the crosshead (7) being connected with a drive apparatus (19) acting in its direction of displacement.

13 Claims, 3 Drawing Sheets

METHOD OF CONNECTING ELECTRICAL CONDUCTORS AND APPARATUS FOR CARRYING OUT THE METHOD

FIELD OF INVENTION

This invention relates to a method of and apparatus for connecting electrical conductors such as stranded wire by means of ultrasonics.

DESCRIPTION OF PRIOR ART

A known method of connecting electrical conductors is carried out in a compaction chamber of variable cross-section, which is bounded by an approximately horizontal sonotrode surface and three anvil surfaces displaceable relative thereto partly in a horizontal and partly in a vertical direction. Firstly, the electrical conductors are laid in the compaction chamber, which is open on one side, whereupon the compaction chamber is closed by displacing the first anvil surface, whereafter the height of the compaction chamber is reduced by common vertical displacement of the second anvil surface, which is opposite the sonotrode surface, and of the third anvil surface, which is opposite the first anvil surface. This causes compaction of the electrical conductors, the ultrasonic action being carried out during the compaction, whereupon finally the compaction chamber is opened by displacement of all of the anvil surfaces into their original positions and the then connected conductors are removed therefrom.

Apparatuses suitable for carrying out the aforementioned method are known (DE-OS Nos. 35 08 122, DE-OS 35 29 943). According to the state of the art the electrical conductors to be connected by ultrasonic welding, after they are placed in the compaction chamber which has been adjusted to the desired cross-section and this chamber has been closed by horizontal displacement of a first anvil part (DE-OS No. 35 08 122) and by vertical displacement of a bar (DE-OS No. 35 29 943), are compacted without change to the width of the compaction chamber by vertical displacement of the second and third anvil surfaces and are subjected to the ultrasonic vibrations emitted by the sonotrode surface that forms the lower boundary to the compaction chamber.

The conductor nodes thereby produced possess the cross-section of a horizontal rectangle. If the relationships of the cross-section dimensions are suitably determined and the process is correctly carried out, good welding results are achieved by the known method. It has, however, been found that the compaction of the conductors is not completely uniform across the node cross-section. In particular, the degree of compaction that can be achieved depends upon the position in height of the cross-sectional point considered of the conductor nodes.

OBJECT OF THE INVENTION

An object of the present invention is to provide a method and apparatus especially suitable for carrying out the method, by means of which a greater degree of uniformity in the compaction of the conductors in the node cross-section can be achieved.

SUMMARY OF THE INVENTION

According to one aspect of the present invention, there is provided a method of connecting electrical conductors, such as stranded wire by means of ultrasonics in a compaction chamber of variable cross-section, which is bounded by an approximately horizontal sonotrode surface and three anvil surfaces, displaceable relative thereto partly in a horizontal direction and partly in a vertical direction, wherein initially the electrical conductors are laid in the compaction chamber which is opened towards one side, whereupon the compaction chamber is closed by displacement of the first anvil surface, whereafter the height of the compaction chamber is reduced by common vertical displacement of the second anvil surface, which is opposite the sonotrode surface, and of the third anvil surface, which is opposite the first anvil surface, there being a first compaction phase for the conductors by common vertical displacement of the second and third anvil surfaces, after which a second compaction phase is carried out by common horizontal displacement of the first and second anvil surfaces with simultaneous continuation of the common vertical displacement of the second and third anvil surfaces, the ultrasonic action being carried out during the second compaction phase, whereupon finally the compaction chamber is opened by displacement of all the anvil surfaces into their starting positions and the connected conductors are removed therefrom.

Preferably, the method consists in dividing the conductor compaction operation into two different compaction phases, the compaction movement taking place in a vertical direction and without ultrasonic action in the first compaction phase, whereas in the second compaction phase the compaction movement is a superimposed movement, which takes place both in a vertical and also in a horizontal direction and accompanied by ultrasonic action. In the second compaction phase accordingly both the height and also the width of the conductor node decreases. It has been found that in this way a conductor compaction which extends very uniformly substantially over the entire conductor cross-section is obtained. The quality of the conductor nodes ultrasonically welded by the present method is accordingly excellent.

The displacements of the three anvil surfaces may advantageously be carried out by mechanical coupling. Preferably, in the present method, the three anvil surfaces are, however, displaced in accordance with a program control.

For facilitating and accelerating the laying of the electrical conductors into the compaction chamber and the removal of the finished conductor node, it is of advantage if the second anvil surface is initially displaced until it is situated outside the compaction chamber, i.e. is no longer opposite the sonotrode surface. In this manner, the whole initial width of the compaction chamber, i.e. virtually the whole width of the sonotrode working surface, is available for the insertion and removal of the conductors. After the insertion of the conductors, the second anvil surface is advanced, as the upper boundary to the compaction chamber. This can take place before the displacement of the first anvil surface or simultaneously therewith, but can also take place after displacement of the first anvil surface. In each case, the compaction chamber is closed at the top by this movement sequence.

According to DE-OS No. 35 08 122, an apparatus for connecting electrical conductors such as strands by ultrasonics is known, which is suitable especially for carrying out the present method and comprises a sonotrode for generating ultrasonic vibrations, a multi-part anvil serving as counter-tool, and a compaction chamber of variable cross-section for the electrical conductors, bounded by three anvil surfaces and one sonotrode surface, the longitudinal axis of which chamber is orientated parallel to the conductors to be connected and the ends of which are open for passage of the conductors, a first anvil part possessing the first anvil surface being displaceably mounted parallel to the sonotrode surface and overlapping it with a narrow air gap, whereas the second and third anvil surfaces are provided on a second anvil part, which is displaceably mounted along the third anvil surface opposite to the first anvil surface while maintaining a narrow air gap relative to a surface of the sonotrode parallel and adjacent to it, and is connected with a crosshead, on which there are situated the second anvil surface opposite the sonotrode surface and an abutment surface for the first anvil surface, the two anvil parts being connected with a drive apparatus for the displacement movements.

According to another aspect of the present invention, there is provided an apparatus for connecting electrical conductors such as stranded wire by ultrasonics comprising a sonotrode generating ultrasonic vibrations, a multi-part anvil serving as counter-tool and a compaction chamber of variable cross-section, bounded by three anvil surfaces and one sonotrode surface, for the electrical conductors, the longitudinal axis of which chamber is orientated parallel to the conductors to be connected and the ends of which are open for passage of the conductors, wherein a first anvil part possessing the first anvil surface is mounted displaceable parallel to the sonotrode surface and overlapping it with a narrow air gap, whereas the second and third anvil surfaces are provided on a second anvil part, which is mounted displaceable along, the third anvil surface opposite the first anvil surface, a narrow air gap being maintained relative to a surface of the sonotrode adjacent and parallel to it, and which second anvil part is connected with a crosshead, on which the second anvil surface, opposite to the sonotrode surface, and an abutment surface for the first anvil surface are situated, the two anvil parts being connected with a drive apparatus for the displacement movements, wherein the crosshead is mounted displaceable parallel to the sonotrode surface on the second anvil part and is connected with a drive apparatus acting in the direction of displacement.

This form of apparatus enables the present method to be carried out by causing a displacement of the crosshead during the second compaction phase of the method, which is in the same direction as, and is constrained by, the displacement of the first anvil part. Independently of the stated method, this particular form of the apparatus can also be used for an infinitely fine adjustment of the width of the compaction chamber and also for a programmed movement control of the crosshead. The latter facilitates any desired movement controls of the surfaces bounding the compaction chamber, especially also when the two parts of the anvil are each connected with a separate drive apparatus for independent movement control.

For the mechanical displacement coupling of the three anvil surfaces, the apparatus can be so constructed that the drive apparatus is an entraining device firmly connected with the crosshead, against which entraining device the first anvil part or a component displaceable together with the first anvil part strikes before the first anvil surface can be pressed force-transmittingly against the abutment surface of the crosshead. In this construction of the apparatus, the crosshead is entrained by the entraining device in the displacement direction of the first anvil part as soon as the first anvil part strikes the entraining device. In order to avoid too high friction between the first anvil surface and the abutment surface on the crosshead, the movement coupling to the crosshead takes place before a force-transmitting bearing of the first anvil surface against the aforementioned abutment surface. These two surfaces only need to bear against each other without pressure in order to close the compaction chamber.

In order, after the ultrasonic welding operation, to enable the crosshead again to be moved back into the starting position, the crosshead is favorably displaceable against the force of a restoring spring out of its position which bounds the compaction chamber.

For the co-ordination of the displacement movements of the two anvil parts, in the case of mechanical coupling the arrangement is advantageously such that the first anvil part and the second anvil part possess a common drive apparatus, which acts upon a movably mounted control member which is equipped with two actuator elements, which each engage with associated counter-elements on the first and second anvil parts. The movement of the control member, driven by only one drive apparatus, then determines the displacement movements of both the anvil parts and thus also of the crosshead displaceably mounted on the second anvil part.

In one form of apparatus, the control member may be an angle slider displaceable parallel to the longitudinal axis of the compaction chamber, one arm of which slider faces towards the first anvil part and another arm towards the second anvil part, cam slits formed as actuator elements being provided in both arms, into which cam slits there engage counter-elements constructed as sliding link pins secured to the two anvil parts or to components connected with the anvil parts. By an appropriately kinked form of the cam slits, the movement characteristic given by the present method can be attained.

In another form of apparatus, the control member can be constructed as a three-arm lever, which is pivotably mounted in its central zone about a pivot pin orientated parallel to the longitudinal axis of the compaction chamber, is articulated by one arm to the also pivotally mounted drive apparatus and engages, with its other two arms, the ends of which constitute the actuator elements, into recesses in the two anvil parts or in components connected with the two anvil parts, these recesses forming the counter-elements. Pivotal movements of the three-armed lever produce, in this form of apparatus, displacement movements derived from them of the two anvil parts and thus also of the crosshead.

In one preferred form of apparatus, the drive apparatus for the crosshead is an overrun-free electrical actuator motor, which engages by a drivable threaded actuating spindle into a threaded actuating nut fixed on the crosshead. This form of apparatus permits a completely independent displacement of the crosshead from the displacement movements of the two anvil parts and is therefore especially suitable for the programmed control of the displacement movements of the two anvil parts and the crosshead, especially when one overrun-free electrical actuator motor as drive apparatus for the displacement movements is associated each with both the first and second anvil parts, each drive motor engaging by a driveable threaded actuating spindle into a threaded actuating nut fixed to the associated anvil part or a component connected therewith.

This form of apparatus is suitable for carrying out the present method, the movements of the three anvil surfaces being controlled according to a determined, variable program. The program control can include both the time sequence of the displacement movements and also the distances travelled in each. Also, however, independently of the present method, this form permits any co-ordinated displacement movements of the two anvil parts and of the crosshead.

BRIEF DESCRIPTION OF THE DRAWINGS

For a better understanding of the invention and to show how the same may be carried into effect, reference will now be made, by way of example, to the accompanying drawings, in which:-

DETAILED DESCRIPTION OF SPECIFIC EMBODIMENTS

Figure 1A:
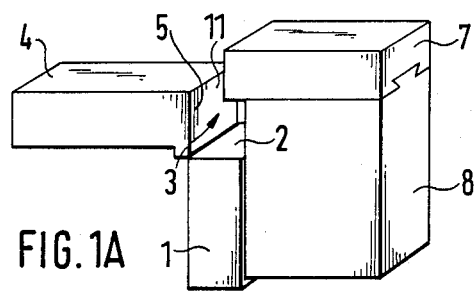
FIGS. 1a–1d illustrate the apparatus parts surrounding a compaction chamber in different relative positions, some in perspective view and some in front view, for the purpose of illustrating the process sequence.

To explain the mold parts of the apparatus surrounding and constituting the compaction chamber, reference is first made to the schematic illustrations of FIGS. 1a to 1d. Of a sonotrode 1, only the sonotrode head and the approximately horizontal sonotrode surface 2 as working surface of the sonotrode are shown here. In other respects the sonotrode 1 is constructed in a usual manner in ultrasonic welding apparatuses of this type. Above the sonotrode surface 2 there is a compaction chamber 3, open at both ends, which changes its dimensions and form during the welding and compaction operations, as shown in FIGS. 1a to 1d. Relative to the sonotrode 1, which may be regarded as stationary, the other mold components are displaceable, partly horizontally and partly vertically, as described below.

Immediately above the sonotrode surface 2 and overlapping this in all positions with a narrow air gap, a first anvil part 4 is disposed horizontally displaceable, i.e. displaceable parallel to the sonotrode surface 2, a first anvil surface 5 being situated on this anvil part. A second anvil surface 6 is opposite and parallel to the sonotrode surface 2 and is situated on a crosshead 7, which is mounted horizontally displaceable on a second anvil part 8. The second anvil part 8 possesses a third anvil surface 9, parallel and opposite to the first anvil surface 5. The second anvil part 8 is mounted vertically displaceable, while maintaining a narrow air gap with respect to the sonotrode surface adjacent to it. Other features of the apparatus are described below in more detail.

Before the start of the welding and compaction operation, the components are in the position shown in FIG. 1a, in which the first anvil part 4 is displaced to the maximum towards the left as viewed in the Figure, so that an insertion gap 11 is formed between the first anvil surface 5 and an abutment surface 10 on the crosshead 7 opposite and parallel to it. The second anvil part 8 with the crosshead 7 slidably mounted thereon are situated in their raised position, in which the greatest and, possibly, adjustable vertical distance exists between the sonotrode surface 2 and the second anvil surface 6.

Figure 1B:
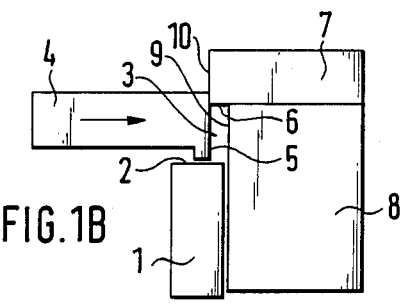
Figure 1C:
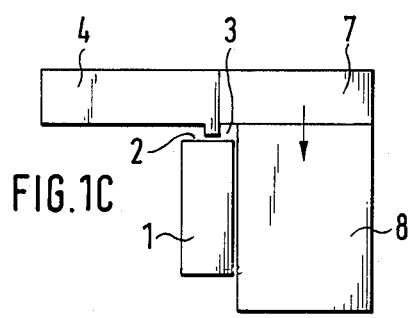
Figure 1D:
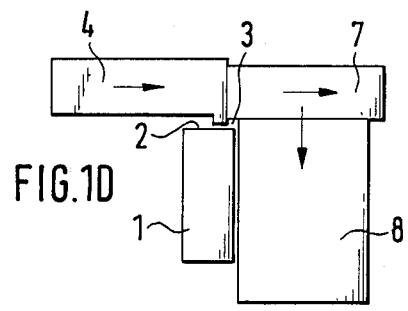

After the conductors to be welded together have been laid through the insertion gap 11 the compaction chamber 3 is closed, by horizontal displacement of the first anvil part 4 until the first anvil surface 5 bears without pressure against the abutment surface 10. Thereafter the first compaction phase of the method commences, by downward movement of the second anvil part 8 together with the crosshead 7 while the first anvil part 4 remains stationary. The position of the tool components, which these components adopt approximately at the conclusion of the first compaction phase, is shown in FIG. 1c. As can be seen from a comparison between FIGS. 1b and 1c, the height of the compaction chamber 3 has already decreased considerably during the first compaction phase, the width remaining constant.

Approximately in the position of the tool components shown in FIG. 1c, the second compaction phase commences, in which a superimposition of movements takes place. On the one hand, the second anvil part 8 and the crosshead connected therewith continue their downward movement, as illustrated by the upright arrow in FIG. 1d, and on the other hand, the first anvil part 4 and the crosshead 7 now move jointly towards the right, as viewed in the Figure. This reduces both the height and the width of the compaction chamber 3. During this second compaction phase, vertical and horizontal compaction actions simultaneously take place upon the conductors enclosed in the compaction chamber 3. During the second compaction phase, the ultrasonic energy is activated, so that the enclosed conductors are welded together.

Figure 2:
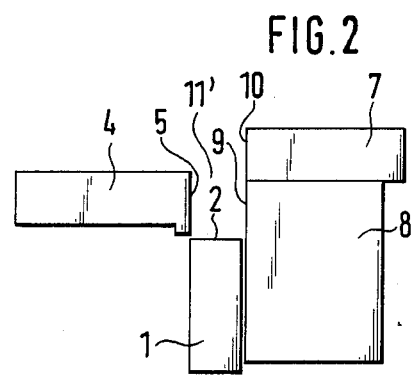
FIG. 2 is a further front view of the components surrounding the compaction chamber when the crosshead is situated outside the compaction chamber.

In the position of the tool components illustrated in FIG. 2, the crosshead 7 is displaced, as viewed in the drawing, sufficiently far to the right for its abutment surface 10 no longer to project beyond the third anvil surface 9. In this manner, a very wide insertion gap 11' is obtained, which has virtually the whole width of the sonotrode surface 2 and substantially facilitates the placing of the conductors in the compaction chamber before the compaction and welding operation and the removal of the welded conductor node out of the compaction chamber. If the construction of the ultrasonic welding apparatus permits the position of the tool components illustrated in FIG. 2, then the working cycle commences with the position of the components illustrated in FIG. 2. After the ultrasonic welding operation, the compaction chamber 3 is opened by appropriate return movement of the tool components into the position shown in FIG. 1a or FIG. 2 respectively, so that the finished conductor nodes can be removed.

Figure 4:
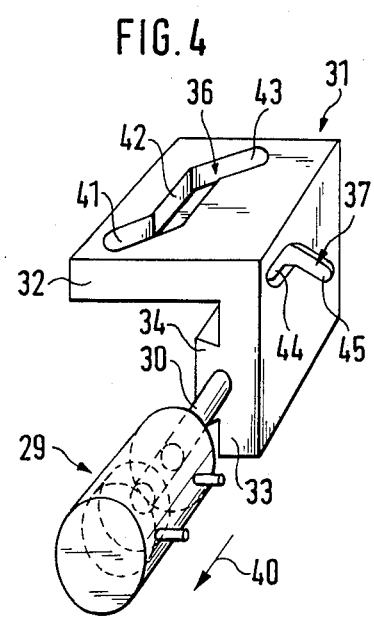
FIG. 4 is a perspective view of a control member of the apparatus shown in FIG. 3.
Figure 3:
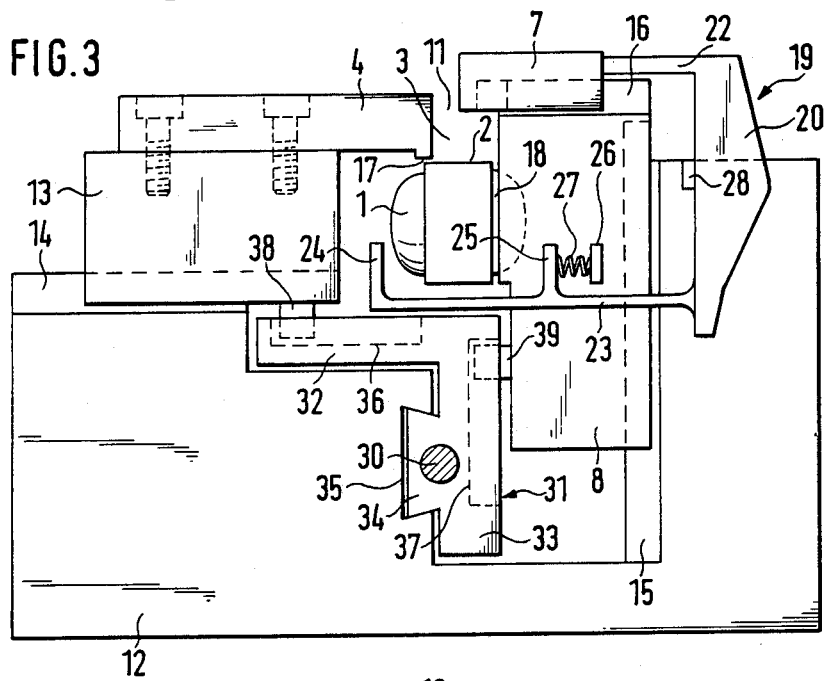
FIG. 3 is a front view of a first form of ultrasonic welding apparatus.

For explaining a first form of embodiment of the entire apparatus, reference is now made to FIG. 3 in conjunction with FIG. 4. The base component of the apparatus is a base block 12, on which the anvil parts 4 and 8 are slidably mounted. For this purpose, the anvil part 4 is screwed to a cross slide 13, which is guided horizontally slidably on a guide bed 14 of the base block 12. On a further, vertically orientated guide bed 15, the second anvil part is guided so as to be vertically slidable. The crosshead 7 is guided horizontally slidable on a guide bed 16 of the second anvil part 8. The air gaps 17 and 18 between the first anvil part 4 and sonotrode 1 and between the second anvil part 8 and sonotrode 1 are illustrated oversize in the drawings. In actuality, the gap width is so small that even during welding of fine strands no strands can enter the air gaps.

Figure 5:
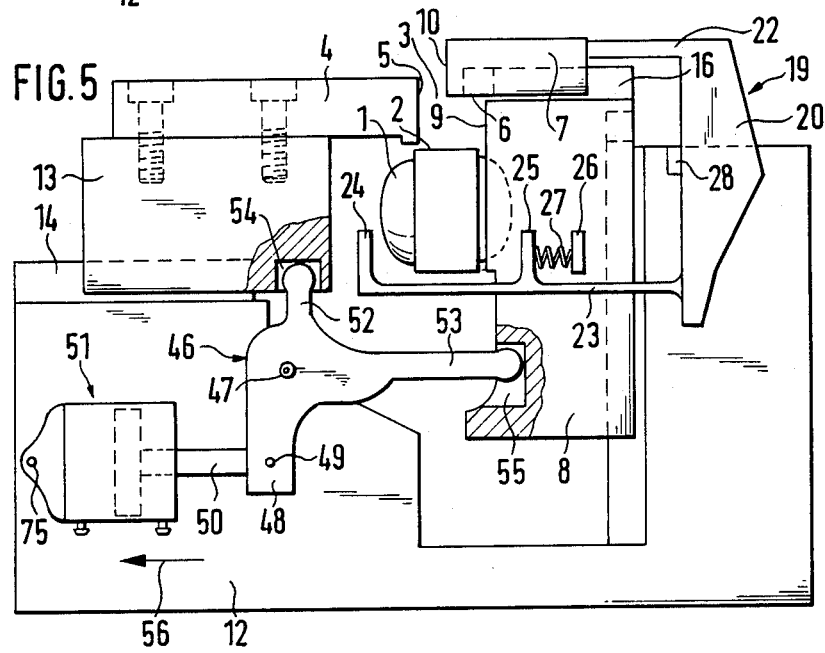
FIG. 5 is a front view of a second form of ultrasonic welding apparatus.

The displacement movement of the crosshead 7 is, in the first example of embodiment according to FIG. 3, produced by a drive apparatus which is the same as that of the second example of embodiment shown in FIG. 5. This drive apparatus consist essentially of an entraining device 19, which accompanies the vertical movements of the second anvil part 8 and of the crosshead 7. A web 22, firmly connected with the crosshead 7, is adjoined by a downwardly orientated bridge part 20, at the lower end of which an abutment rod 23, extending towards the left in the drawing, is fixed, this rod terminating with an abutment 24 in front of the cross slide 13. On the abutment rod 23 there is a projection 25, opposite to and at a distance from which there is a counter-bearing 26 fixed to the second anvil part 8. Between the projection 25 and counter-bearing 26, a restoring spring 27, constructed as a helical compression spring, is clamped. In the open position of the compaction chamber 3 illustrated here, the restoring movement, orientated to the left in the drawing, of the crosshead 7 is limited by a stop 28, fixed to the base block 12. The arrangement is such that, on closure of the compaction chamber 3, that is to say in the displacement of the first anvil part 4 towards the right, the cross slide 13 meets the abutment 24 of the abutment bar 23 before the first anvil surface 5 can bear hard against the abutment surface 10 of the crosshead 7. As the displacement of the first anvil part 4 towards the right continues, the crosshead 7 is also displaced towards the right by the entraining device 19. This common horizontal movement of the first anvil part 4 and of the crosshead 7 corresponds to the second compaction phase of the method described.

In the first embodiment illustrated in FIGS. 3 and 4, one common drive apparatus is provided for the first anvil part 4 and for the second anvil part 8, for example a pneumatic cylinder and piston assembly 29, shown schematically in FIG. 4, the piston rod 30 of which is firmly connected with an angle slider 31, while its cylinder has a firm connection, not illustrated, with the base block 12. The angle slider 31 regulates the co-ordinated movements of the first anvil part 4 and of the second anvil part 8. For this purpose, it possesses two arms 32 and 33, of which the arm 32 faces towards the first anvil part 4 and the arm 33 towards the second anvil part 8. On the arm 33 there is a guide projection 34, by which the angle slider 31 is mounted horizontally slidable in a guide bed 35 of the base block 12. The guide bed 35 is orientated perpendicularly to the guide beds 14 and 16.

On the outer faces of the arms 32 and 33 there are cam slits 36, 37 respectively. Into the cam slits 36 and 37 there engage sliding link pins 38, 39 respectively, of which the pin 38 is fixed on the cross slide 13 and the pin 39 on the second anvil part.

If, starting from the position of the components shown in FIG. 3, the angle slider 31 is displaced in the direction of arrow 40 in FIG. 4 by appropriate air pressurization of the pneumatic cylinder and piston assembly 29, then due to the form of construction of the cam slits 36 and 37 the movement characteristic for the present method is produced for the tool components. For this purpose, the cam slit 36 is composed of three slit portions 41, 42 and 43, while the cam slit 37 is composed of only two slit portions 44 and 45. When the compaction chamber is open as shown in FIG. 3, the sliding link pin 38 is located in the slit portion 41, while the sliding link pin 39 is located in the slit portion 44. If the piston rod 30 is moved in the direction of arrow 40, then the sliding link pin 38 slides in the slit portion 41, orientated obliquely to the direction of movement, causing the cross slide 13 and thus the first anvil part 4 to be displaced towards the right as viewed in FIG. 3. Since the slit portion 44 runs parallel to the direction of sliding of the angle slider 31, the sliding link pin 39 and thus the anvil part 8 remain initially in the position shown in FIGS. 1b and 3. When the cross slide 13 comes into bearing against the abutment 24 of the entraining device, the sliding link pin 38 has left the obliquely orientated slit portion 41 and is situated at the start of the slit portion 42, parallel to the direction of sliding of the angle slider 31. As the displacement of the angle slider 31 continues, therefore, the sliding link pin 38 and with it the first anvil part 4 remain in the closed position reached for the compaction chamber, as illustrated in FIGS. 1b and 1c. Simultaneously, however, the sliding link pin 39 enters the slit portion 45, oblique relative to the direction of sliding of the angle slider 31, so that with continued displacement of the angle slider in the direction of arrow 40 the downward displacement of the second anvil part 8 commences. When, with further continued displacement of the angle slider 31 in the same direction, the sliding link pin 38 again enters the slit portion 43 oblique to the direction of sliding, the cross slide 13 and with it also the first anvil part 4 displace further towards the right. Simultaneously, however, the downward movement of the second anvil part 8 is continued, because the sliding link pin 39 is still located in the oblique slit portion 45. Together with the displacement of the first anvil part 4 towards the right in this second compaction phase, the crosshead 7 is also displaced towards the right by the entraining device 19.

The second embodiment shown in FIG. 5 differs from the embodiment described in relation to FIG. 3 basically by a different form of construction of the control member which causes movement of the mold components. This member is here constructed as a three-armed lever 46, which is pivotally journalled in central region about a pivot pin 47, fixed to the base block 12. With its downwardly pointing arm 48, the lever 46 is articulated, by a bearing pin 49, to the piston rod 50 of a cylinder and piston assembly 51, driven pneumatically for example. The cylinder of this assembly 51 is connected pivotally to the base block 12 by a pivot pin 75.

With the ends of its other two arms 52 and 53, the three-armed lever 46 engages into a recess 54 in the cross slide 13 and recess 55 in the second anvil part 8 respectively. Whereas the recess 54 in the cross slide 13 closely surrounds the associated arm end, the recess 55 in the second anvil part 8 is formed to a slit-shape, the associated end of the arm being situated, in the open position of the compaction chamber 3 illustrated in FIG. 5, in the upper end of the slit-shaped recess 55.

As a result of the described arrangement, in the second embodiment illustrated in FIG. 5, a different movement characteristic exists from that of the first embodiment described in relation to FIG. 3. If the piston rod 50 is moved in the direction of arrow 56 in FIG. 5, all the arms of the three-armed lever 46 pivot clockwise. Whereas the upwardly orientated arm 52, on account of the practically existing form-fit with the recess 54, immediately entrains the cross slide 13 and therefore the first anvil part 4 to the right as seen in the drawing, the end of the arm 53 first moves in the slit-shaped recess 55 through a dead travel, so that the second anvil part 8 is not displaced downwards. Suitable means are provided here for preventing unintentional downward displacement of the second anvil part 8 when the end of the arm 53 moves downwards out of the position shown in FIG. 5. This first movement of the first anvil part 4 still corresponds to the illustration of principles according to FIG. 1b. When the end of the arm 53 has arrived at the lower end of the recess 55, the second anvil part 8 is displaced downwards, as the three-armed lever 46 continues clockwise pivoting. On account of the form-fit between the recess 54 and the end of the arm 52, however, the first anvil part 4 is also further displaced horizontally towards the right and entrains the crosshead 7 by means of the entraining device 19. In the case of the apparatus according to FIG. 5, therefore, two compaction phases do not take place successively, but superimposed horizontal and vertical compactions are simultaneously carried out. A prerequisite for this is, once again, the displacement capability according to this invention of the crosshead 7 on the second anvil part 8.

Figure 6:
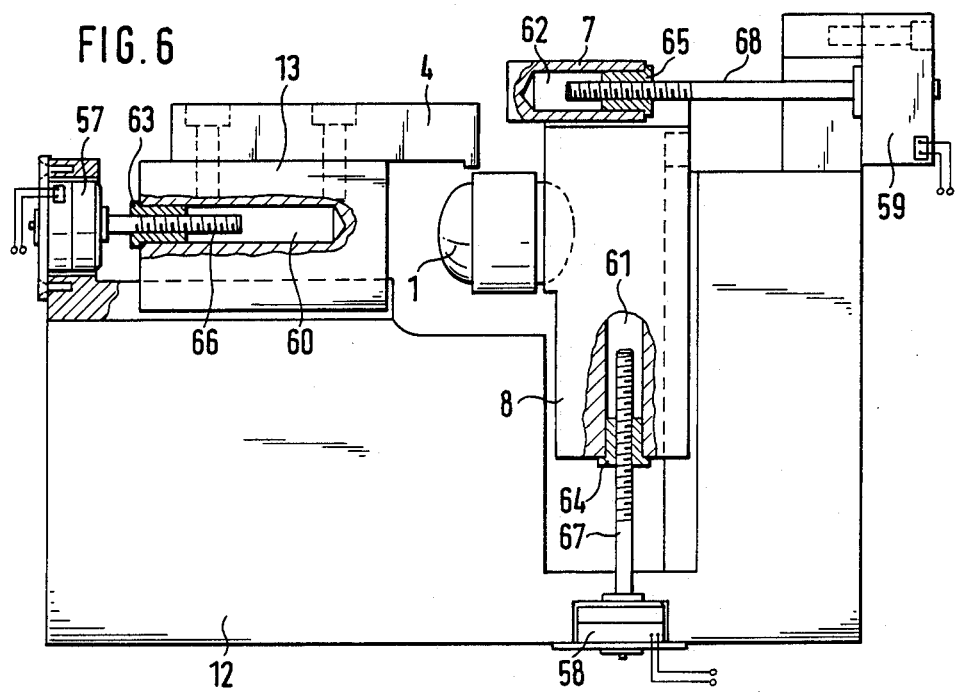
FIG. 6 is a front view of a third form of ultrasonic welding apparatus.
Figure 7:
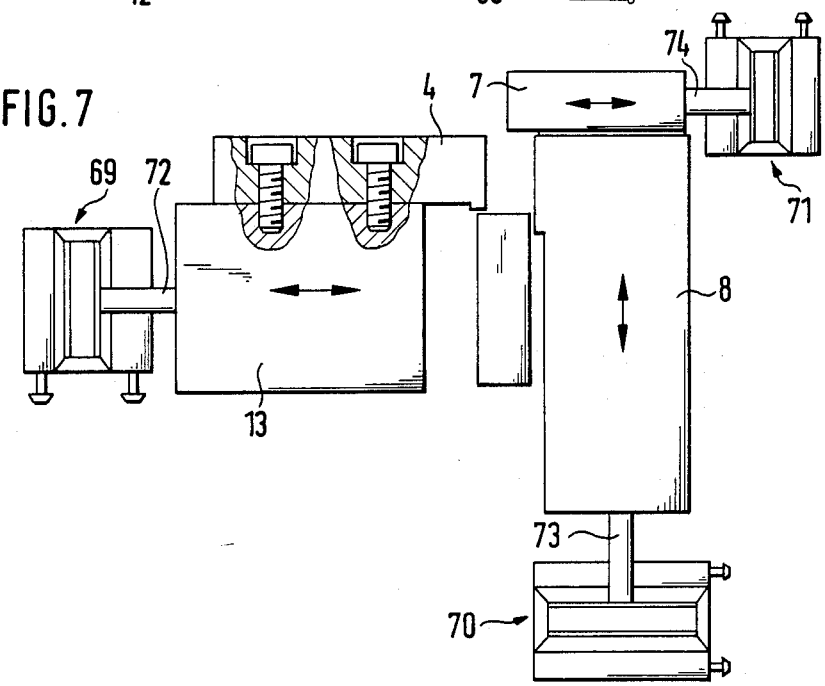
FIG. 7 is a front view of a fourth form of ultrasonic welding apparatus, showing important elements of the apparatus.

The third embodiment of the apparatus illustrated in FIG. 6 has the common feature with the fourth embodiment illustrated in FIG. 7 that the crosshead 7 and the two anvil parts 4 and 8 are each connected with a separate drive apparatus, with the result that the displacement movements of these three tool components can be adapted to one another in a desired manner by a suitable program circuit, with the result that any desired movement characteristic of the two anvil parts 4 and 8 and of the crosshead 7 is made possible, including the movement characteristic stated with reference to FIGS. 1a to 1d and 2.

In the form of embodiment shown in FIG. 6, one overrun-free, electrical actuator motor 57, 58, 59 respectively is associated with each of the two anvil parts 4 and 8 and with the crosshead 7. The actuator motors are firmly connected with the base block 12. In the cross slide 13, the second anvil part 8 and the crosshead 7, there is a blind bore 60, 61, 62 respectively in each, the blind bore being closed towards the outside by a threaded actuating nut 63, 64, 65 respectively. A threaded actuating spindle 66, 67, 68 respectively, is screwed into each actuating nut, each capable of being rotatably driven in either direction by the associated actuating motor. The actuator motors also permit very small increments of angular rotation, so that correspondingly small displacement movements for the connected tool components are possible. On the other hand, however, correspondingly long displacement movements can be obtained by appropriate numbers of rotations of the threaded actuating spindles. This embodiment, like the embodiment described in relation to FIG. 7, permits a displacement of the crosshead 7 into the position shown in FIG. 2.

In the case of the fourth embodiment illustrated in FIG. 7, all the actuator motors 57, 58 and 59 of the embodiment according to FIG. 6 are replaced by pneumatically or hydraulically operated cylinder and piston assemblies 69, 70 and 71. The associated piston rods 72, 73 and 74 are firmly connected with the cross slide 13, second anvil part 8 and crosshead 7. For individual drive of the three tool components, actuator motors and cylinder and piston assemblies may also be used in combination.

I claim:

1. A method of connecting electrical conductors, such as stranded wire by means of ultrasonics in a compaction chamber of variable cross-section, Which is bounded by an approximately horizontal sonotrode surface and three anvil surfaces, displaceable relative thereto partly in a horizontal direction and partly in a vertical direction, wherein initially the electrical conductors are laid in the compaction chamber which is opened towards one side, whereupon the compaction chamber is closed by displacement of the first anvil surface, where after the height of the compaction chamber is reduced by common vertical displacement of the second anvil surface, which is opposite the sonotrode surface, and of the third anvil surface, which is opposite the first anvil surface, there being a first compaction phase for the conductors by common vertical displacement of the second and third anvil surfaces, after which a second compaction phase is carried out by common horizontal displacement of the first and second anvil surfaces with simultaneous continuation of the common vertical displacement of the second and third anvil surfaces, the ultrasonic action being carried out during the second compaction phase, whereupon finally the compaction chamber is opened by displacement of all the anvil surfaces into their starting positions and the connected conductors are removed therefrom.

2. A method according to claim 1, wherein the displacements of the three anvil surfaces are carried out by mechanical coupling.

3. A method according to claim 1, wherein the three anvil surfaces ar displaced in accordance with a program control.

4. A method according to claim 3, wherein the second anvil surface is displaced until it is situated outside the compaction chamber to allow for laying the conductors in and removing them from the compaction chamber.

5. An apparatus for connecting electrical conductors such as stranded wire by ultrasonics comprising a sonotrode generating ultrasonic vibrations, a multi-part anvil serving as counter-tool and a compaction chamber of variable cross-section, bounded by three anvil surfaces and one sonotrode surface, for the electrical conductors, the chamber having a longitudinal axis which is orientated parallel to the conductors to be connected and ends which are open for passage of the conductors, wherein a first anvil part possessing the first anvil surface is mounted displaceable parallel to the sonotrode surface and overlapping it with a narrow air gap, whereas the second and third anvil surfaces are provided on a second anvil part, which is mounted displaceable along the third anvil surface opposite the first anvil surface, a narrow air gap being maintained relative to a surface of the sonotrode adjacent and parallel to it, and which second anvil part is connected with a crosshead, on which the second anvil surface, opposite to the sonotrode surface, and an abutment surface for the first anvil surface are situated, the two anvil parts being connected with a drive apparatus for the displacement movements, wherein the crosshead is mounted displaceable parallel to the sonotrode surface on the second anvil part and is connected with a drive apparatus acting in the direction of displacement.

6. An apparatus according to claim 5, wherein the drive apparatus is an entraining device firmly connected with the crosshead, onto which entraining device the first anvil part or a component dispaceable together with the first anvil part comes into bearing, before the first anvil surface can be pressed force-transmittingly against the abutment surface of the crosshead.

7. An apparatus according to claim 6, wherein the crosshead is displaceable out of a position bounding the compaction chamber against the force of a restoring spring.

8. An apparatus according to claim 5, wherein the first anvil part and the second anvil part possess a common drive apparatus which acts upon a movably mounted control member, which is equipped with two actuator elements, which each engage with associated counter-elements on the first and second anvil parts.

9. An apparatus according to claim 8, wherein the control member is an angled slider, mounted displaceable parallel to the longitudinal axis of the compaction chamber, the slider having one arm which faces towards the first anvil part and another arm facing towards the second anvil part, cam slits being provided in the two arms as actuator elements, into which cam slits there engage counter-elements constructed as sliding link pins, fixed to the two anvil parts or to components connected with the two anvil parts.

10. An apparatus according to claim 8, wherein the control member is constructed as a three-armed lever, which is pivotally mounted in its central zone about a pivot pin parallel to the longitudinal axis of the compaction chamber, is articulated by one arm to the likewise pivotally mounted drive apparatus and engages with its other two arms, the ends of which constitute the actuator elements, into recesses in the two anvil parts or in components connected with the anvil parts, these recesses forming the counter-elements.

11. An apparatus according to claim 5, wherein the drive apparatus for the crosshead is an overrun-free electrical actuator motor, which engages by a drivable threaded actuating spindle into a threaded actuating nut fixed on the crosshead.

12. An apparatus according to claim 5, wherein one overrun-free electrical actuator motor each is associated also with the first and the second anvil parts as drive apparatus for the sliding movements, which motor engages, by a drivable threaded actuating spindle, into a threaded actuating nut fixed to the associated anvil part or a component connected therewith.

13. An apparatus according to claim 12, wherein the drive apparatus for the crosshead and/or the drive apparatus for at least one of the anvil parts is constructed as a pressurized fluid cylinder and piston assembly.

* * * * *